Jan. 15, 1935.  J. BIJUR  1,987,600
COUPLING AND THE LIKE
Original Filed Oct. 5, 1921
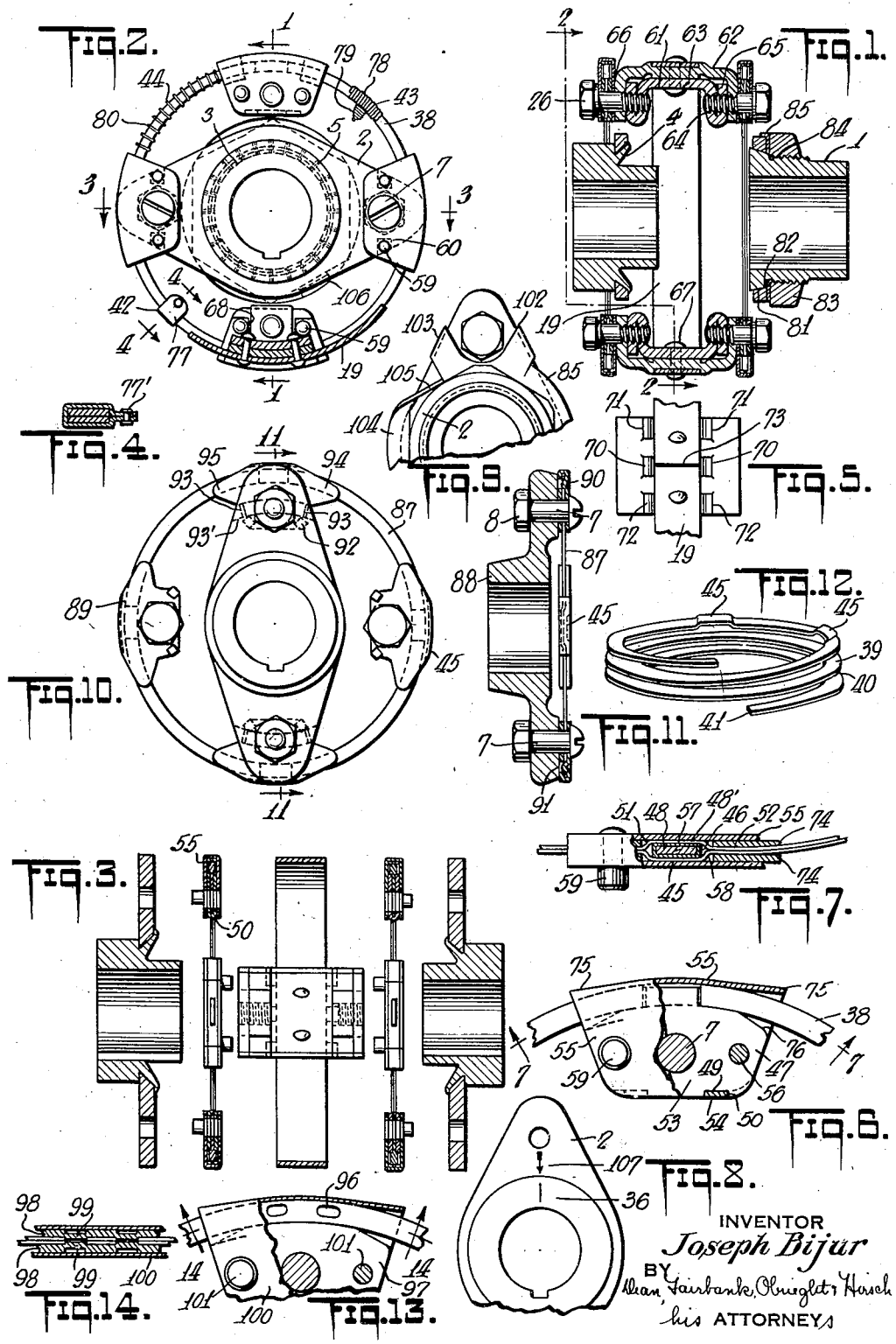
INVENTOR
*Joseph Bijur*
BY
*Dean, Fairbank, Obrieglts, Hirsch*
*his* ATTORNEYS Patented Jan. 15, 1935

1,987,600

UNITED STATES PATENT OFFICE 1,987,600

COUPLING AND THE LIKE

Joseph Bijur, New York, N. Y.; George Bijur, executor of said Joseph Bijur, deceased, assignor to Bikor Corporation, a corporation of Delaware Original application October 5, 1921, Serial No. 505,593, now Patent No. 1,682,721, dated August 28, 1928. Divided and this application August 28, 1928, Serial No. 302,516

37 Claims. (Cl. 64—96)

My present invention relates to mechanical couplings for driving one shaft element from another and with regard to its more specific applications to couplings of the type by which the need for precision in the alignment of the shafts is eliminated. The invention has application broadly for transmitting torque from a power or driving element to an adjacent driven machine or shaft. The embodiment disclosed, although of broad utility is particularly applicable to automotive vehicles, as, for instance, in transmitting torque between the engine and accessory machines, such as magnetos, generators and water pumps.

The invention in its preferred application is concerned with the type of coupling structure in which each hub is connected to or carries a separate and distinct yieldable member extending about the axis of the coupling, the two yieldable elements being in turn drivingly connected by a more rigid transmission member, although certain important features of the invention are more broadly applicable to other structural types of couplings.

It is an object of the invention to provide a simple, reliable and durable coupling, which shall transmit the torque even between poorly aligned shafts with a minimum of wear upon the associated shaft bearings.

Another object is to provide a practical coupling of the above type of short length, useful in relations where economy of length is desirable or required and where the distance between adjacent shaft ends is correspondingly small, and which coupling shall yet lend itself readily to connection between shaft ends separated by a greater interval.

Another object is to provide a coupling in which the connecting elements for holding the constituent coupling parts in assembled relation firmly retain their hold without the likelihood of wear or loosening even under severe conditions of use, so that the yield in the coupling shall be confined to the elements intended to yield, avoiding rattling and eliminating a cause of lag and lead of the shafts with respect to each other.

Another object is to provide a coupling of the above type, the connecting parts of which shall be simple and easily accessible for facility in mounting into operative position, and removal, or dismounting and without the use of specialized tools or the exercise of dexterity.

Another object is to provide a coupling which shall readily flex for application to misaligned shafts without yielding in the driving direction, and which shall yet be so constructed and arranged that destructive distortion or flexure beyond safe limits is avoided.

Another object is to provide a coupling of the above type in which the flexible parts shall be easily and quickly removable for replacement, without the exercise of skill or the use of specialized tools.

Another object is to provide a coupling of the above type in which the fastening means for holding the flexible element in position shall be so differentiated from those holding the hub units to the transmission element, as to avoid the possibility of confusion when a coupling is to be removed from the shaft or when a flexible element is to be replaced.

Another object is to provide a coupling of the above type, the parts of which shall not interfere with the vertical movement up or down of the coupled machine, such as a magneto, in removal or installation.

The present application is a division of my application Serial No. 505,593, filed October 5th, 1921, which eventuated in Patent #1,682,721 granted August 28, 1928.

Other objects will be in part obvious and in part pointed out hereinafter.

The above and other features of my invention may be more fully understood from the accompanying drawing in which are shown one or more of various possible embodiments of the several features of the invention.

Figure 1 is a view in transverse section through a coupling embodying the invention.

Figure 2 is a sectional view on the staggered line 2—2 of Figure 1.

Figure 3 is a sectional view taken on the line 3—3 of Figure 2 showing the constituent parts separated and alined in proper order for assembly.

Figure 4 is a sectional detail taken along the line 4—4 of Figure 2.

Figure 5 is a detail of the transmission element.

Figure 6 is a plan view on an enlarged scale of a preferred form of wire clamp.

Figure 7 is a sectional view taken along the line 7—7 of Figure 6.

Figure 8 is a fragmentary plan of a hub detail.

Figure 9 is a fragmentary plan of another hub detail.

Figure 10 is a view similar to Figure 2 of a further modification.

Figure 11 is a sectional view taken along the line 11—11 of Figure 10, showing one of the hubs and the associated ring.

Figure 12 is a view of a fragment of wire stock used for the flexible coupling element.

Figure 13 is a view similar to Figure 6 of a modified form of clip, and

Figure 14 is a section taken along the line 14—14 of Figure 13.

Referring now to Figs. 1 to 5 of the drawing, there is represented a coupling comprising a pair of hubs 1 of familiar form, each provided with a flange 2 extending outwardly therefrom along one diameter, the said flange being preferably a stamping having a central opening 3 passed over the hub, the hub upset as at 4 into scallops 5 at the edge of the flange opening to rigidly secure the parts together. Thus, by a simple operation, the flange is fastened to the hub both against removal and against relative rotation, the upset rim performing the first function, and the hub metal pressed into the scallops, the second.

The embodiment shown comprises a pair of said hub units each carrying a flexible ring 38 said rings disposed at opposite sides of an interposed transmission element including bridging pieces to which the rings are secured at points, 90 degrees from or midway between the ends of the flanges.

In the preferred embodiment the ring 38 is of small width and large diameter substantially equal to the longer diameter of the flange 2, which extends outwardly from the hub along one diameter. The flexible ring is of metal, preferably at least as sound at its edges as between the edges. It may be formed of one or more sheet metal stampings, subsequently cut, filed or otherwise treated at its edges to remove the minute cracks which frequently develop thereat in the stamping process. Preferably, however, the ring is formed from drawn steel wire stock, flattened as shown and wound into a coil, a fragment of which is shown in Figure 12. The ring may be made from round drawn wire, flattened by mechanical working, as by rolling or by passing through appropriate dies, and has a width 39 materially greater than its thickness 40 and preferably a rounded edge 41. The term "drawn wire" is used for want of a better term to define the property of the material resulting from the drawing process and, of course, embraces wire of substantially the same properties made by other mechanical processes, such as set forth in the preceding sentence.

In the preferred embodiment, each coupling ring is formed by severing two complete circumferences 38 from the stock shown in Fig. 12, superposing them with the split ends one over the other and connecting them against relative slipping by any desired binding elements, alternate forms of which are shown at 42, 43 and 44 in Figure 2 and will be fully described below.

Preferably the rings are provided with shallow offset depressions 45 at intervals of a quadrant, which may be formed in the stock, as shown in Fig. 12, for cooperation with fastening elements to secure the rings to the other coupling elements. The superposed rings are disposed with the concavities of the offsets facing each other as shown at 46 in Figure 7 and at uniform intervals of a quadrant.

The four fastening elements or mechanical terminals on each ring are identical and preferably operate by a gripping action. Each gripping element comprises a small center plate 47 having a spacer tongue 48 extending radially outwardly into the space 46 between the two registering offset and encircled by a sheet metal sleeve 48'. The center plate is straddled at its radially innermost edge 49 by a doubled plate or clip 50 cut away between the ends of its free edges as at 51 to clear the tongue 48 and the adjacent portions, of the wires 38 and serving to clamp said wires beyond the block as at 52. For accurately positioning the clip with respect to the center plate, the plate has a short tongue 53 at its radially innermost edge 49 fitting into a corresponding slot 54 in the adjacent portion of the clip 50.

The construction thus far described is covered by an outer or cover clip 55 straddling the outer periphery of the wire, the sides of said outer clip overlapping the offset portions of the wires and the sides of the inner clip 50. The outer clip, the inner clip and the center plate are maintained in assembled relation preferably by a pair of rivets 56 extending through all those members and located at opposite sides of the spacer tongue, and spaced radially inwardly from the wires. The split end of each wire is preferably positioned in the center of an offset and the corresponding clamp units serve to hold said split ends against separation. The clamp element thus far described, will firmly grip the wires because of the substantial surface on which clamping pressure is applied, at the offset portions 45, and also beyond the same as at 52, the shoulders 58 connecting the offsets 45 to the main length of the wires serving also as substantial positive stops against slipping. The firm hold of the clamp is secured without perforating or notching the wires, so that the uniform strength of the wire throughout its length is preserved.

The ring thus far described is secured by two of the wire clamp units to the ends of the hub flange 2 by means of bolts 7 extending transversely through the various superposed plates and clip elements, preferably midway between the rivets 56 as shown in Figure 2, and the bolt ends are upset as at 8 over the nuts 9, which are disposed at the outer surface of the flanges 2.

To rigidly retain the clamp units with respect to the flange, that is, to prevent any eventual rocking about the bolt as an axis, the rivets 58 that maintain the clips in assembled relation are preferably provided with relatively thick heads 59 (see Figures 2 and 6) which extend into corresponding notches 60 in the edges of the hub flanges 2. The bridges are preferably provided with notches 68 at opposite sides, in which fit the thickened heads 59 of the rivets of the associated clamp units to prevent rocking of said units about the securing screws 26 in a manner generally similar to the relation of the other pair of clamps with respect to the hub flange. It will be seen that the notches 60 and 68 in the flanges and bridges respectively for preventing rocking of the clamp units, can be formed in the original blanking out process without need for special machining.

The transmission unit comprises stamped metal bridging pieces. Each of the bridging pieces comprises an inner U or channel-shaped stamping 61 and an outer U or channel-shaped stamping 62 straddling the same. The inner stamping includes a cross-piece 63 having legs 64 doubled over as at 65 and the legs 66 of the outer stamping overlap the doubled-over legs of the inner stamping, the bases of the channels contacting each other. The triple thickness of metal at each side of the composite bridging element thus formed is tapped to secure a firm hold for fastening screws 26 by which the clamp units midway between those attached to the hub flanges are secured to the bridging pieces. The yieldable connecting band 19 between the bridges is preferably connected to the bridging pieces by the same rivets 67 which secure the two constituent elements of the bridge pieces together.

In the preferred embodiment the outer channel elements of the bridge pieces have three pairs of struck-up lugs 70, 71 and 72 for snugly contacting the opposite edges of the band 19, thereby preventing shift with respect to the bridging pieces and maintaining them at all times exactly at right angles to the length of the band, regardless of the strain to which the coupling is subjected. The central pair 70 of struck-up lugs on one of the bridging pieces extends transversely across the split ends 73 of the band, preventing any shifting thereof and the other pairs of lugs prevent any lateral shift of the band at the portions coacting therewith, so that each end of the band is firmly held at two spaced points, and, therefore, cannot change its angular relation with respect to the bridging pieces and is firmly anchored.

To prevent the likelihood of sharp bends of the metal ring units 38 adjacent the clamps which might in the absence of special precaution occur, particularly where the coupling is used to transmit power between shafts that are misalined to a substantial degree, the clamps are preferably flared at the edges, as shown at 74 by pounding the lateral edges of the inner clip element 50, thereby guiding the wires for gentle curvature and preventing sharp bends which might bring about weakening and rupture of the wires, where they pass rapidly through their cycles of flexure in operation.

Preferably also the cover clip 55 as shown is formed with a smaller curvature than the wire, so that it diverges as at 75 from the outer periphery of the wire and preferably also the center plate 47 has oblique shoulders 76 diverging from the inner periphery of the wire, thus providing limiting stops to prevent excessive deflection of the wire in a radial direction, while preventing rubbing or friction between the wire and adjacent parts of the clip when the wire flexes lengthwise of the coupling or between the flares 74 of the clip in its rapidly repeated cycles of flexure.

The flexible metal driving rings being of small width relative to their periphery and the clamp units carried thereby of small width radially, ample space is afforded between the innermost edges of the opposite clips to readily clear a hub of conventional dimensions, as appears clearly in Figure 1. It will thus be seen that the flexible metal ring construction can easily be passed over the outer end of the hub and can be secured to the outer face of the flange 2, thus providing a particularly short coupling construction, in which the thickness of the two rings and of the clamp units is not an added component of the overall length of the coupling. Of course, as suggested in Figure 3, where desired, the flexible metal ring units may be secured to the inner surface of either or both of the flanges.

The binding means for retaining together the pair of wires, making up a ring element, are preferably in the form shown at 42 heretofore referred to and comprise each a sheet metal clip band 77 embracing the two wires preferably midway between each of the two adjacent clamp units, the ends of which are fastened by a rivet 77', as best shown in Figure 4.

As an alternative embodiment, the binding means may be formed of small-gauge metal wire as at 78, wound about the central portion of the quadrant with its convolutions close together and having its ends twisted together as at 79 and bent radially inwardly to avoid the danger of cutting.

As another alternative embodiment, the securing means may be a small-gauge wire 80, wound with relatively high pitch about the two rings, and extending freely without special securing means for the entire length of each quadrant between successive clamps as shown.

It will be understood that one form of fastening means preferably the clip shown at 42, will be employed for each of the quadrants of the ring.

In use, it is found that the coupling is substantially unyielding in the direction of rotation. This is accounted for by the fact that the clamps firmly grip the rings without possibility of slip, that each clamp is firmly retained against rocking about the threaded element which secures it to the adjoining coupling element, that each clamp unit is firmly secured to the associated hub or bridging member and will not loosen by wear, that the band 19 of the transmission element prevents displacement of the bridges out of parallelism, so that neither hub member can advance with respect to the other, and that the ring quadrants are of such strength relative to the forces transmitted that they will not stretch appreciably under tension. Although thus rigid in the driving direction, the coupling flexes with remarkable facility in every other direction. The hubs can be moved toward each other or drawn apart with little effort to accommodate the coupling for connection between shaft ends separated by varying distances, and similarly the hubs can be displaced with little effort angularly or laterally with respect to each other to correspond to inaccuracies encountered in practice in the relative disposition of the shafts.

In operation, therefore, the coupling will transmit the torque accurately without lag or lead between poorly alined shafts, while the lateral pressure upon the bearings of the connected shafts will be small even where the misalinement is substantial, the lateral pressure corresponding, of course, to the small force required to deflect the hubs with respect to each other in the course of application. Thus, by the use of my coupling the shafts to be connected need not be disposed with respect to each other with the degree of accuracy required where couplings of less flexibility are employed, effecting corresponding economy in skilled labor.

The flexible rings, in the embodiment of Figures 1 to 7, being of drawn wire have had no weaknesses or cracks developed in their edges. In view of the continuity of the edges of the drawn wire the rapidly repeated flexure does not result in any appreciable weakening, where, in the case of the usual stamped metal driving rings or quadrants, the minute cracks in the edges may develop into tears with corresponding need for frequent replacement. As distinguished from ordinary stamped metal rings or quadrants, the lateral edges of which are cut, and therefore, different in character and tenacity from the wider surfaces, I have provided a ring element homogeneous sidewise and edgewise, and of substantially uniform tenacity. My invention embraces broadly, flexible coupling elements of homogeneous surface, whether round or flat, solid or hollow, unitary or composite and devoid of minute cracks.

The flattened wire construction particularly in view of the large diameter affords the desired substantial flexibility in a direction lengthwise of the coupling and substantial stiffness against distortion in a radial or edgewise direction, so that the uniform interval of a quadrant between successive clamps will be maintained throughout. The double flat wire ring has the advantage of greater flexibility lengthwise of the coupling than a single wire ring of double thickness. Each of the two wire rings above, is preferably of sufficient strength to transmit the torque, so that, should one of the wire elements of a quadrant break in operation the coupling will not be disabled. The binding elements which hold the two wire elements of each quadrant together for convenience in assembly, as heretofore pointed out, perform the further function of retaining a ruptured wire against lashing about, and thus serve to prevent damage to other parts of the coupling or of adjacent elements, upon wire breakage. It is, of course, obvious that a circular wire ring may be employed instead of the flattened wire rings, but I prefer the latter for reasons appearing in the foregoing.

Since the coupling does not permit lag or lead of the driven shaft with respect to the driving shaft, it is suitable for driving magnetos. To effect proper timing adjustment of the magnetos so that the spark will take place in correct phase with the engine rotation, one of the hubs is preferably arranged to be adjustable, as shown in Figure 1. For this purpose the flange 2 is provided with a beveled opening 81 fitting over a beveled or conical flange 82 at the end of the hub and held in frictional driving relation therewith by a nut 83 threaded upon the hub as at 84, and exerting pressure upon the adjacent side of the flange 2.

As best shown in Figures 1 and 9, a lock washer 85 is interposed between the flange and the nut. This washer is preferably a simple stamping having tongues 102 and 103 to embrace the edges of the flange as shown, and having a circular body 104 affording segments as at 105 projecting beyond the sides of nut 83. Preferably the tongues 102, 103 are normally slightly bent and will be pressed toward each other by the mechanic after application, to snugly embrace the flange, and one of the segments 105 will be bent over the adjacent side of the nut as at 105, thereby firmly holding the nut against rotation relative to the flange.

To effect shaft adjustment, it is obvious that the nut 83 need merely be loosened, the segment 105 being, of course, first bent toward its plane and the hub with its key can be rotated through the desired angle with respect to the flange 2 and the nut then again tightened to frictionally connect the parts and a segment of washer 85 preferably other than that previously used is bent over against a side of the nut for locking. The adjustment means is a simple construction involving only a conical fit between the hub and the flange, and a simple nut and locking washer for tightening the connection.

Preferably a mark such as an arrow 107 pointing toward the hub is scratched into the innermost surface of the flange 2 to assist in reapplying or in adjusting a coupling removed for repair or other purposes, without the need for retiming the magneto. It will be obvious that for this purpose the mechanic before removing the coupling hub from the magneto shaft will scratch the interior surface of the hub as at 36 in alinement with the arrow 107 on the flange, the large open wire ring affording ready access to the inner end of the hub for this purpose.

Automotive accessory machines, and particularly magnetos are frequently retained against sliding along the supporting bed by the use of short dowel pins projecting downwardly thereinto. Where my coupling is used with such machines, the removal is particularly easy, for the reason that, after taking out the two screws 26 holding a flange to the transmission piece, the machine can be raised vertically sufficiently to remove the dowels from the base, the metal ring flexing readily to cause the rivet heads 59 to clear the notches in the bridging pieces.

In Figures 10 and 11 is shown an alternative form of metal ring hub unit. In this embodiment a single metal ring 87 is shown in place of the double ring and the hub and flange are shown formed in a single forging as at 88. For use of the single wire each clamp is preferably formed of a single U-shaped sheet metal clip element 89 straddling the ring from the exterior periphery, and having an indented or struck-in portion 90 in registry with the offset 45 of the wire, said offset being thereby held within a corresponding slot 91 in the opposite surface of the clip.

In this embodiment, although the clamp unit may be formed of a metal plate and provided with a flare as in Figures 6 and 7, I have shown an alternative form of spring metal clip. Tangs 92 are bent up from one side of the sheet metal clip and forced over the other to maintain the two sides clamped together against the wire, one pair of diametrically opposite clips on each ring being secured to the flanges of the hubs by bolts and the other pair of the bridging pieces by screws substantially as in the other embodiment. The clamping action of the threaded members assists in the gripping action of the clips. In the present embodiment prongs or tangs 93 are bent up from a side of each clip and extend preferably into grooves 94 machined into the surface of the flange 2, which grooves may be coaxial with the coupling, thus serving as antirock means to prevent movement of the clips about the bolts as an axis. Similar tangs on the bridging piece clips coact for the same purpose with recesses in the bridging pieces (not shown) in a manner similar to the coaction of rivets 59 with recesses 68 in Figure 2.

Both leaves of the clips are formed with integral spring tongues extending laterally from opposite sides of the gripping portion, as at 94 and 95 and along the length of the wire, and preferably wide at their bases and tapering to narrow ends, as shown. These spring tongues will be flexed by the ring as the latter is flexed in transmitting torque between poorly alined shafts. As the tongues are relatively stiff near their bases and more flexible at their narrow ends, the wire will be held thereby against appreciable bending at the point of attachment, but will bend more freely at the tongue ends. Thus, the spring tongues will prevent any sharp, destructive bend of the drawn wire, and will perform substantially the function of the flare in the embodiment of Figures 10 and 11. In use, when the coupling transmits torque between inaccurately alined shafts, the spring tongue will return to initial position by virtue of its elasticity as the adjacent portion of the wire ring returns to the neutral plane from its position of maximum flexure.

Although I prefer to employ the specific form of wire clamp element shown in Figures 6 and 7, it will, of course, be obvious that the spring clip form of Figures 10 and 11 may be substituted in the form of coupling shown in Figures 1 to 3, also, that the double wire embodiment of Figures 1 to 3 may be substituted in the embodiment of Figures 8 and 9.

An alternative form of clip is shown in Figures 13 and 14, in which elongated slots 96 are cut near the split ends and also at the ends of each quadrant of the flexible wire, a spacing plate 97 of a thickness equal to the combined thickness of the two flattened wires being placed adjacent the inner periphery thereof, clamping plates 98 straddling the opposite surfaces of the wire one having embossments 99 pressed thereinto to fit into the openings 96, the whole being clasped by a U-shaped outer element 100 straddling the outer periphery of the wires, and held in assembled relation by rivets 101 passing transversely through the outer clip, the clamping plate and the spacing plate.

Obviously many of the details in the various embodiments set forth, and especially the clamp units, the anti-rock arrangement, the flexure limiting flare of Figures 6 and 7 or the spring metal tongue of Figure 10 for the same purpose, and the use of drawn wire quadrants or rings or the equivalent are broadly applicable separately or in combination in other relations, for instance, to couplings of the type embodying a single flexible ring member connected at spaced intervals directly to two hubs.

Having thus described my invention, what I claim as new and desire to secure by Letters Patent is as follows:

1. In a flexible coupling of the type comprising a pair of shaft engaging elements, a flexible driving member extending about the axis of the coupling and driving connections between said elements and said driving member, the connections for one of said elements being intermediate those for the other; the driving member including a flat flexible metal piece transverse to the coupling axis, said metal piece consisting of drawn steel wire stock.

2. In a flexible coupling of the type comprising a pair of hubs, a drawn steel flat wire ring, the plane of which is transverse to the coupling axis, said ring being substantially coaxial with said hubs and driving connections between one of said hubs and spaced points of said ring, and other driving connections between the other hub and points on said ring midway between said spaced points.

3. In a flexible coupling, in combination, a pair of hubs having outstanding flanges, a ring of flexible drawn metal wire, wide relative to its axial thickness, said ring being substantially co-axial with said hubs, means connecting the flange on one of said hubs to diametrically opposite points of said ring, and means connecting the other hub to diametrically opposite points on said ring midway between said first pair of points.

4. A flexible coupling comprising in combination, a pair of hubs, a flexible metal member comprising a succession of flat metallic arcs interposed between said hubs centered upon the coupling axis for transmitting the torque longitudinally thereof from one of said hubs to the other, and connecting means between said flexible member and said hubs comprising metal members gripping the ends of said arcs and fastening means for attaching said gripping means with respect to said hubs, said fastening means extending transversely of and to one side of said flexible arcs, said arcs together forming an annulus of diameter substantially that of the external diameter of the coupling.

5. In a flexible coupling, in combination, a flexible metal ring of small width relative to its diameter, metal clips clamping said ring at uniform intervals, said clips having each a portion extending radially inwardly from the ring, said portion serving for securing the ring in position for torque transmission.

6. In a flexible coupling, in combination, a metal ring uniform in cross-section throughout the entire length thereof and clips firmly gripping said ring at spaced intervals, said clips including portions at opposite sides of the ring extending radially inwardly therefrom and rivets or the like within the inner periphery of the ring for holding said clip portions together.

7. In a flexible coupling, in combination, a succession of flat flexible metallic arcs positioned side by side, members gripping said arcs near the ends thereof, hub elements secured to said members alternately to transmit the torque through said arcs, and means to prevent rocking of said members about the securing elements as axes.

8. In a flexible coupling, in combination, a pair of relatively rigid hub elements, a flexible metallic ring of small width relative to its diameter for transmitting the torque from one of said coupling members to the other, the transmitting connections with said ring comprising clips gripping said ring at spaced intervals and secured to said rigid members, and anti-rock pin and slot means coacting with said clips and said rigid members to prevent rotation of the former about the securing means as an axis.

9. The combination set forth in claim 8 in which the anti-rock means comprises a securing element for the jaws of the clip projecting outwardly into coaction with a corresponding shoulder on the adjoining rigid member.

10. In a coupling, in combination, a flexible driving ring, a coupling element of greater rigidity and a connection therebetween, said connection comprising a clip having jaws gripping said flexible member and having portions extending beyond the same, rivets passing through said portions to secure them together, a threaded member extending through said portions between said rivets and into said rigid member, said rivets having heads fitting into corresponding recesses in said rigid member to prevent rocking of said clip about said threaded member as an axis.

11. A flexible coupling comprising in combination, a flexible metallic ring of small width relative to its diameter, coupling members of greater rigidity, one connected to said ring at diametrically opposite points and the other connected with respect thereto at diametrically opposite points midway between said first pair of diametrically opposed points, the connection means between said ring and said members being substantially of the character set forth in claim 10.

12. In a flexible coupling, in combination, a ring of flattened drawn wire, of uniform cross-section throughout the length thereof, said ring having an offset portion of short length and a clamp having jaws gripping said offset portion and rigidly secured together, whereby the shoulders connecting the offset portion to the main length of the ring will positively assist in preventing slipping thereof.

13. In a flexible coupling, in combination, a flexible element composed of a pair of drawn wire rings, thin edgewise and having a relatively greater width between their outer and inner peripheries, clips at uniform intervals for gripping the two wires, hubs for transmitting the torque to and from the flexible element, and means for securing said clips to said hubs.

14. In a flexible coupling, in combination, a flexible element composed of a plurality of parallel flexible wire elements for transmitting torque, a first hub, means securing said elements at uniform intervals to said first hub, a second hub, means midway between said first means for securing said elements with respect to said second hub, and binding means for said elements between said securing means to prevent lashing if a wire element should snap or break.

15. In a flexible coupling, in combination, a flexible element composed of a plurality of parallel drawn wire flattened rings contacting each other, clips gripping said wires at intervals of a quadrant for securing to coupling elements, and binding clips encircling the quadrant segments of the wires substantially midway between the fastening clips.

16. In a flexible coupling of the type set forth in claim 13, in which the clips coact with lateral offsets in the wire elements, having their concavities opposite each other.

17. In a flexible coupling, in combination, a clip for gripping a flexible element including a pair of superposed flattened wire rings, said clip having a center plate with a tongue extending between corresponding lateral offsets of the two wires, a clip straddling said plate and cut away at the offsets to clear the same and serving to clamp said wires beyond said offsets, and means securing said clip and said center plate together.

18. The combination set forth in claim 17 in which the clip straddles the radially innermost edge of the plate and in which a cover plate straddles the exterior periphery of the ring and in which a pair of rivets secure the cover clip, the inner clip and the center plate together to exert a gripping action upon the wires.

19. In a flexible coupling, in combination, a metal ring of small width relative to its diameter, clips gripping said ring at uniform intervals for securing the same in torque transmitting relation between coupling elements of greater rigidity, said clips having portions integral therewith extending adjacent the wire and beyond the gripping portions to limit the angle of flexure of the wire.

20. In a flexible coupling, in combination, a clip for gripping a flexible element including a pair of superposed flattened wire rings, said clip having a center plate with a tongue extending between corresponding lateral offsets of the two wires, a clip straddling said plate and cut away at the offsets to clear the same and serving to clamp said wires beyond said offsets, and means securing said clip and said center plate together, the lateral edges of the clip being flared to afford a limiting guide for the curvature of the flexible element.

21. In a flexible coupling, in combination, a pair of hubs, a flexible metal ring of diameter substantially equal to the exterior diameter of the coupling and of relatively small width, connected at uniform intervals alternately with respect to the two hubs to transmit the torque, each connecting means comprising a clip element gripping the ring and extending radially inwardly therefrom, transverse pivotal fastening means extending through the clip, within the inner periphery of the ring and into the associated coupling member and means on each said clip constructed and arranged to coact with the associated coupling member to prevent rocking of said clip about the pivotal fastening means as an axis.

22. In a flexible coupling, in combination, a pair of hubs, a flexible metal ring of diameter substantially equal to the exterior diameter of the coupling and of relatively small width, connected at uniform intervals alternately with respect to the two hubs to transmit the torque, each connecting means comprising a clip element gripping the ring and each clip having means at the lateral edges thereof for permitted limited flexure of the ring toward or away from the hubs and toward or away from the axis.

23. In a flexible coupling, in combination, a flexible metal ring of small width relative to its diameter, clips gripping said ring at uniform intervals for securing the same to coupling elements of greater rigidity, each said clip having integral portions at the sides thereof beyond the gripping area to limit the angle of flexure of the adjacent ring segment and each said clip offering clearance for the outer and inner peripheries of the ring to prevent friction at the edges.

24. In a flexible coupling, in combination, a metal wire flexible ring of small width relative to its diameter, clips gripping said ring at uniform intervals for attachment to coupling elements of greater rigidity, and flexible tongues adjacent the gripping portions of said clips extending for a short range along the lengths of the wire segments adjacent the clips for limiting the angle of flexure of the segments.

25. In a flexible coupling, in combination, a metal wire flexible ring of small width relative to its diameter, spring metal clips gripping said ring at intervals of a quadrant for securing to coupling elements of greater rigidity, each said clip having integral tongues extending beyond both jaws and the opposite ends thereof, and along the length of the adjacent wire segments to resist a sharp angle of flexure.

26. In a flexible coupling, in combination, a metal wire flexible ring of small width relative to its diameter, spring metal clips gripping said ring at intervals of a quadrant for securing to coupling elements of greater rigidity, each said clip having integral tongues extending beyond both jaws and the opposite ends thereof, and along the length of the adjacent wire segments to resist a sharp angle of flexure, said tongues being stiffer at their bases than at their free ends.

27. In a flexible coupling, in combination, a transmission element including a plurality of parallel bridging elements, each composed of a plurality of superposed stamped metal pieces having a plurality of thicknesses of metal at their ends tapped for firm attachment of screws, and a band element secured to each of said bridges between the ends thereof and connecting the same.

28. A transmission member for a flexible coupling comprising in combination, a pair of bridge elements each comprising a pair of U or channel-shaped pieces having their bases and sides overlapped, the sides of one of said U-shaped pieces being reversely bent, thereby to form a triple thickness of metal at each end of each of the bridges, said triple thicknesses being tapped for firm connections of screws, and a relatively stiff metal band extending about said bridges and secured thereto, said bridges having struck-up portions coacting with the edges of said band to prevent shifting of the latter with respect to the bridges.

29. A transmission member for a flexible coupling comprising in combination, a pair of bridge elements each comprising a pair of U or channel-shaped pieces having their bases and sides overlapped, the sides of one of said U-shaped pieces being reversely bent, thereby to form a triple thickness of metal at each end of each of the bridges, said triple thicknesses being tapped for firm connections of screws, and a relatively stiff metal band extending about said bridges and secured thereto, said bridges having struck-up portions coacting with the edges of said band to prevent shifting of the latter with respect to the bridges, said split ends of the band overlapping one of the bridges and the bridge portion having three pairs of struck-up elements snugly engaging opposite edges of the band, the central pair of said struck-up members extending across the split ends of the band.

30. In a flexible coupling of the type comprising a pair of shaft engaging elements, a flexible driving member extending about the axis of the coupling and driving connections between said elements and said driving member, the connections for one of said elements being intermediate those for the other; the driving member including a flexible metal piece, the entire surface of which is of homogeneous character.

31. In a flexible coupling of the type comprising a pair of shaft engaging elements, a flexible driving member extending about the axis of the coupling and driving connections between said elements and said driving member, the connections for one of said elements being intermediate those for the other; the driving member including a flat flexible metal piece transverse to the coupling axis, said metal piece consisting of a flattened and coiled round drawn wire, said driving member having substantial rigidity against distortion in the plane of the ring and substantial flexibility for distortion lengthwise of the coupling.

32. In a flexible coupling of the type comprising a pair of shaft engaging elements, a flexible driving member extending about the axis of the coupling and driving connections between said elements and said driving member, the connections for one of said elements being intermediate those for the other; the driving member including a flat flexible metal piece transvese to the coupling axis, said metal piece consisting of sheet metal stampings with treated edges to remove cracks therefrom, said driving member having substantial rigidity against distortion in the plane of the ring and substantial flexibility for distortion lengthwise of the coupling.

33. In a flexible coupling of the type comprising a pair of shaft engaging elements, a flexible driving member extending about the axis of the coupling and driving connections between said elements and said driving member, the connections for one of said elements being intermediate those for the other; the driving member including a flat flexible metal piece transverse to the coupling axis, said metal piece consisting of a sheet metal stamping with filed edges, said driving member having substantial rigidity against distortion in the plane of the ring and substantial flexibility for distortion lengthwise of the coupling.

34. In a flexible coupling, in combination, a flexible circular metal driving element transverse to the coupling axis having an offset recess, a clip formed of parallel plates gripping said element for effecting a connection to a coupling member of greater rigidity and having an extension into said recess, said recess preventing slippage of said element.

35. In a flexible coupling, in combination, a circular element of flat drawn wire transverse to the coupling axis, said element having an offset recess, a plate member with an extension enclosed in said recess, clamping means having jaws gripping the recess and member together and means securing the jaws together, said means extending transversely through said jaws and to one side of said wire.

36. In a flexible coupling, in combination, a series of flexible metal circular elements transverse to the coupling axis, parallel plate clips gripping said elements and serving to secure the same with respect to coupling elements of greater rigidity, and metallic plates clamped by said clips extending beyond the gripping portions of said clips on both sides of said elements to serve as guides for limiting the angle of flexure of said elements.

37. In a flexible coupling, in combination, a flexible ring formed of a plurality of parallel flat wire elements positioned side by side and transverse to the coupling axis, parallel plate-like clips for gripping said wire elements at uniform intervals and holding them together, hubs at opposite sides of said ring, said elements being provided with offset recesses and said clips being provided with extensions in said recesses.

JOSEPH BIJUR.